(12) United States Patent
Miyahara et al.

(10) Patent No.: US 7,756,298 B2
(45) Date of Patent: Jul. 13, 2010

(54) IMAGE PROCESSING DEVICE FOR VEHICLE

(75) Inventors: Takayuki Miyahara, Kariya (JP); Hiroaki Kumon, Kariya (JP); Hiroshi Murase, Nagoya (JP)

(73) Assignees: DENSO CORPORATION, Kariya (JP); National University Corporation Nagoya University (JP)

( * ) Notice: Subject to any disclaimer, the term of this patent is extended or adjusted under 35 U.S.C. 154(b) by 1071 days.

(21) Appl. No.: 11/448,517

(22) Filed: Jun. 7, 2006

(65) Prior Publication Data

US 2007/0008182 A1 Jan. 11, 2007

(30) Foreign Application Priority Data

Jun. 8, 2005 (JP) ............................. 2005-168627

(51) Int. Cl.
*G06K 9/00* (2006.01)
*G08G 1/017* (2006.01)

(52) U.S. Cl. ....................................... 382/104; 340/937
(58) Field of Classification Search ................ 382/100, 382/103, 104, 164–165, 171–173, 181, 199, 382/224–225, 236, 256, 260; 348/113, 118, 348/121–122; 352/57, 66; 345/419; 342/73–104; 340/907, 933; 701/1–124, 200–210; 324/300, 324/304, 315

See application file for complete search history.

(56) References Cited

U.S. PATENT DOCUMENTS 5,987,152 A * 11/1999 Weisser ....................... 382/104
6,362,773 B1    3/2002 Pochmuller
6,442,465 B2 *  8/2002 Breed et al. ................... 701/45
6,580,385 B1    6/2003 Winner et al.
6,877,879 B2 *  4/2005 Holz et al. .................. 362/259
6,941,211 B1    9/2005 Kuroda et al.
2005/0072922 A1  4/2005 Moisel et al.

FOREIGN PATENT DOCUMENTS

| DE | 199 22 963 | 11/2000 |
| JP | 11-142168 | 5/1999 |
| JP | 2003-050274 | 2/2003 |
| JP | 2004-037474 | 2/2004 |

OTHER PUBLICATIONS

Office action dated May 9, 2008 in German Application No. 10 2006 026 724.9 with translation.
Search Report with Written Opinion dated Jan. 7, 2009 in French Application No. 06 05060.

* cited by examiner

*Primary Examiner*—Samir A Ahmed
*Assistant Examiner*—Mehdi Rashidian
(74) *Attorney, Agent, or Firm*—Harness, Dickey & Pierce, PLC

(57) ABSTRACT

An image processing device for a vehicle includes a radar for transmitting a radio wave outside of the vehicle and detecting an object in a first area outside of the vehicle by using a reflected wave of the transmitted radio wave; a camera for acquiring an image in a second area including the first area; and an image processing unit for processing the acquired image to detect, in the acquired image, the object detected by the radar. Visibility outside of the vehicle is detected based on result of detection of the radar and result of detection of the camera.

10 Claims, 4 Drawing Sheets

IMAGE PROCESSING DEVICE FOR VEHICLE

CROSS REFERENCE TO RELATED APPLICATIONS

This application is based on and incorporates herein by reference Japanese Patent Application No. 2005-168627 filed on Jun. 8, 2005.

FIELD OF THE INVENTION

The present invention relates to an image processing device for a vehicle.

BACKGROUND OF THE INVENTION

A lidar (Light Detection and Ranging) in Patent Document 1 includes (i) a scanning means for transmitting a laser beam, and (ii) a photo detector for detecting reflected light of the transmitted laser beam and converting the reflected light to a reception signal. The lidar transmits the laser beam to a reference target such as a building, calculates an atmosphere attenuation based on the reflected light coming from the reference target which reflects the transmitted laser beam, and determines an amount of rain and a visibility distance based on the calculated atmospheric attenuation.

In the conventional lidar, it is necessary to transmit the laser beam to the reference target and detect the reflected light in order to determine the visibility distance. Therefore, the lidar cannot determine the visibility distance when there is no reference target such as a building around the lidar.

Patent Document 1: JP-2004-37474A

SUMMARY OF THE INVENTION

It is an object of the present invention to provide an image processing device for a vehicle which is capable of detecting visibility around the vehicle by using result of detection of an object.

As a first aspect of the present invention, an image processing device for a vehicle is provided as follows: an object detecting means is included for transmitting a radio wave outside of the vehicle and detecting an object in a first area outside of the vehicle by using a reflected wave of the transmitted radio wave; an image acquisition means is included for acquiring an image in a second area including the first area; an image processing means is included for processing the acquired image to detect, in the acquired image, the object detected by the object detecting means; and a visibility detecting means is included for detecting visibility outside of the vehicle based on result of detection of the object detecting means and result of detection of the image processing means.

In the case of bad weather such as fog which degrades visibility around the vehicle, the object detecting means using the radio wave (for example, a millimeter wave) is still capable of detecting the object around the vehicle except for the case of heavy rain. In contrast, the image acquisition means takes in this case a blurred image which cannot show the object clearly. The preceding vehicle detected by the radar may be therefore not detected even after the image processing means processes the blurred image detected by the image acquisition means.

The image processing device detects the visibility around the vehicle based on the result of the detection of the object detecting means and the result of the detection of the image processing means. Thus the image processing device can detect poor visibility around the vehicle based on the result of detection of the object detecting means.

As a second aspect of the present invention, an image processing device for a vehicle is provided as follows: an object detecting means is included for transmitting a radio wave outside of the vehicle and detecting a distance from the vehicle to an object in a first area outside of the vehicle by using a reflected wave of the transmitted radio wave; an image acquisition means is included for acquiring an image of a second area including the first area; an image processing means is included for executing frequency analysis of the acquired image; and a visibility distance estimating means is included for estimating a visibility distance outside of the vehicle based on the detected distance and result of the frequency analysis.

As described above, the object is clearly shown in the clear image acquired by the image acquisition means when no fog is around the vehicle. On the other hand, the object is not clearly shown in the blurred image acquired by the image acquisition means when the fog is around the vehicle. Sharpness (or edge enhancement) of a border between two objects in the acquired image becomes higher as the acquired image becomes clearer. In the frequency characteristics of the brightness distribution in the acquired image, high frequency components therefore become more dominant as the acquired image becomes clearer.

Even if the visibility distance is constant, a degree of blur of the acquired image varies depending on the distance between the object and the vehicle. The image processing device can therefore estimate the visibility distance around the vehicle based on the result of frequency analysis of the brightness distribution of the image acquired by the image acquisition means, and the result of the object detecting means.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Hereinafter, examples of embodiments of the present invention will be described with reference to FIGS. 1 to 6.

First Embodiment

Figure 1:
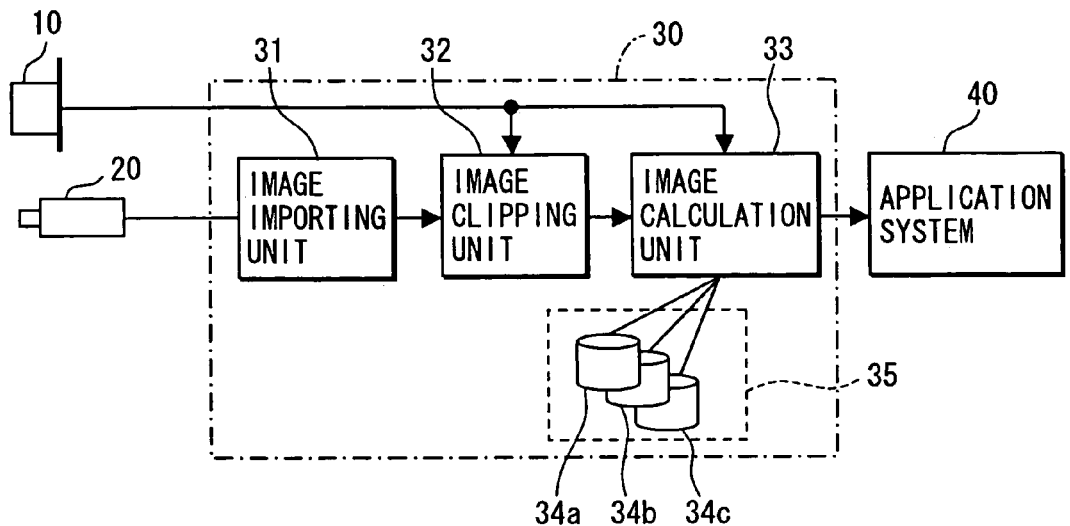
FIG. 1 is a block diagram showing an overall structure of an image processing device as an example according to embodiments of the present invention.

FIG. 1 shows an image processing device for a vehicle (hereinafter referred to as a subject vehicle) as an example of a first embodiment according to the present invention. This image processing device includes a radar 10, a camera 20, and an image processing unit 30. The radar 10 is located at a front portion of the subject vehicle. The radar 10 may be a millimeter wave radar using a radio wave in a millimeter wave band (hereinafter referred to as a millimeter wave). In this case, the radar 10 radiates (that is, transmits) the millimeter wave in a front direction of the subject vehicle from an antenna (not shown), detects a reflected wave of the millimeter wave at the antenna, and detects an object such as a preceding vehicle running in front of the subject vehicle. The radar 10 detects the object when the object is located in a direction within a horizontal (that is, lateral) angle range from the radar 10.

The radar 10 generates object data (or preceding vehicle data) indicating (i) a distance (hereinafter referred to as an inter-vehicle distance) between the subject vehicle and the preceding vehicle, (ii) a relative velocity of the preceding vehicle to the velocity of the subject vehicle, and (iii) a position (hereinafter referred to as a lateral position) of the preceding vehicle relative to the subject vehicle in a direction parallel to the lateral direction of the subject vehicle. The lateral position is, more specifically, a position of the preceding vehicle in the direction parallel to the lateral direction of the subject vehicle from a center point of the front portion of the subject vehicle, which corresponds to the center of the horizontal angle range. The radar 10 outputs the object data to the image processing unit 30 every predetermined period (for example, 100 milliseconds).

The camera 20 may be a visible camera which acquires an image of an outside scene. The camera 20 may include an image sensor such as a CCD (Charge Coupled Device) and may be located at a position where it can acquire an image of a scene in front of the subject vehicle. The image acquired by the camera 20 is similar to a view of a driver. The camera 20 acquires an image of a scene within a predetermined angle range including all or a part of the horizontal angle range of the radar 10.

The camera 20 can be adjusted by a user in a shutter speed of the camera 20, a frame rate of the camera 20, and a gain of a digital signal output from the camera 20 to the image processing unit 30.

As shown in FIG. 1, the image processing unit 30 includes an image importing unit 31, an image clipping unit 32, an image calculation unit 33, and a storage device 35. The storage device 35 includes mapping data having tables 34a to 34c. The image importing unit 31 repeatedly imports from the camera 20 a signal indicating an image acquired by the camera 20 and stores into the storage device 35 the image indicated by the imported signal as front view image data. The image importing unit 31 also reads the front view image data from the storage device 35 and outputs the front view image data to the image clipping unit 32.

The image clipping unit 32 receives the front view image data from the image importing unit 31. Then, based on the inter-vehicle distance and the lateral position included in the object data from the radar 10, the image clipping unit 32 determines a region, which is in the image indicated by the front view image data and is expected to contain a position of the preceding vehicle. The image clipping unit 32 further clips an image (hereinafter referred to as a clipped image) corresponding to the determined region from the front view image data. The image clipping unit 32 then outputs data (hereinafter referred to as clipped data) indicating the clipped image to the image calculation unit 33.

The image calculation unit 33 tries to detect, based on the clipped data from the image clipping unit 32, the preceding vehicle in the image of a front view acquired by the camera 20. The preceding vehicle may be detected by using a well-known method such as a template matching method or a leftright symmetry method. In the template matching method, a shape of the preceding vehicle is searched for in the clipped image by using a predetermined reference image of a model vehicle to detect the preceding vehicle. In the leftright symmetry method, it is determined whether the clipped image indicated by the clipped data is almost symmetric. The preceding vehicle is detected in the clipped image when the image is almost symmetric.

The image calculation unit 33 detects visibility in front of the subject vehicle based on (i) the object data from the radar 10 and (ii) result of trying to detect the preceding vehicle in front of the subject vehicle, i.e., result of whether or not the preceding vehicle is detected in the clipped image.

In the case of bad weather such as fog which degrades or damages visibility around the subject vehicle, the radar 10 using the radio wave such as the millimeter wave is still capable of detecting the preceding vehicle near the subject vehicle except for the case that heavy rain causes the bad weather. In contrast, the camera 20, which serves as an image acquisition means, takes in this case a blurred image in which the preceding vehicle cannot be clearly distinguished from other objects. The image calculation unit 33 may therefore fail to detect the preceding vehicle, which can be detected by the radar 10, in the clipped data corresponding to the blurred image.

In view of this, the image processing device detects the visibility in front of the subject vehicle based on the object data from the radar 10 and the result of trying to detect the vehicle in the clipped image. More specifically, the image processing device detects a poor visibility in front of the subject vehicle when the preceding vehicle indicated by the object data from the radar 10 is not detected in the clipped image corresponding to the location of the preceding vehicle indicated in the object data. It is thus possible to detect the poor visibility in front of the subject vehicle.

Figure 2:
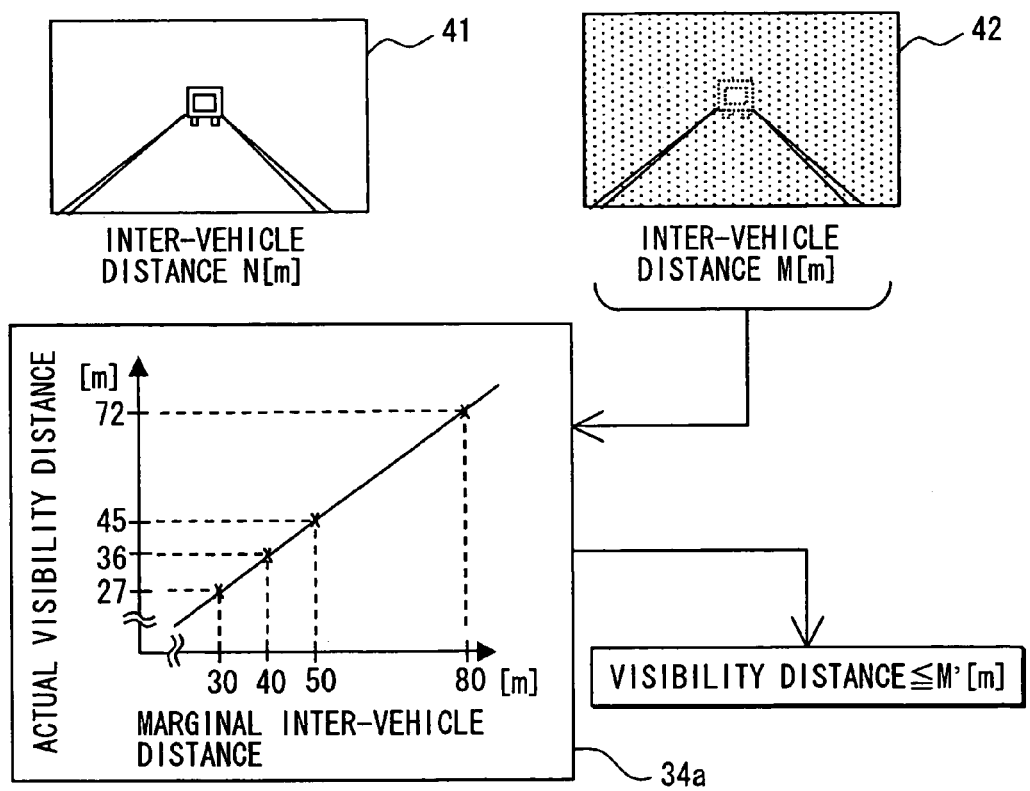
FIG. 2 is a schematic diagram showing a method as an example according to a first embodiment for estimating a visibility distance.

The image calculation unit 33 also estimates a visibility distance in front of the subject vehicle as explained below with reference to FIG. 2. Here, an image 41 acquired by the camera 20 and processed by the image processing unit 30 includes no fog and clearly shows the preceding vehicle. Thus the image calculation unit 33 can detect the preceding vehicle detected by the radar 10. In contrast, an image 42 acquired by the camera 20 and processed by the image processing unit 30 shows a blurred image because of heavy fog around the subject vehicle; therefore, the preceding vehicle cannot be clearly distinguished from other objects. Thus the image calculation unit 33 fails to detect the preceding vehicle detected by the radar 10.

In this condition where the image 42 of the blurred image is acquired, it is likely that the poor visibility causes the image calculation unit 33 to fail to detect the preceding vehicle although the preceding vehicle exists in a position shown by the clipped image. It is therefore possible to estimate that the visibility distance in front of the subject vehicle is equal to or less than the inter-vehicle distance (M meters in FIG. 2) detected by the radar 10 at this time.

Although the camera 20 detects, as is the case with a human's eyesight, visible light coming from its outside, detection characteristics (for example, sensitivity) of the camera 20 may be different from those of the human's eyesight. In view of this, the image calculation unit 33 may correct the difference between the detection characteristics of the camera 20 and the human's eyesight to the visible light by using the visibility distance transformation table 34a, which maps a marginal inter-vehicle distance to an actual visibility distance based on sensitivity of the human's eyesight. The marginal inter-vehicle distance is an inter-vehicle distance at a border between a range of inter-vehicle distances where the image calculation unit 33 fails to detect the preceding vehicle and a range of inter-vehicle distances where the image calculation unit 33 can detect the preceding vehicle.

The image calculation unit 33 outputs the detected visibility in front of the subject vehicle to several application systems 40 through an in-vehicle LAN (not shown). The application systems 40 may include a system which automatically turns on fog lights based on detecting the fog.

The application systems 40 may also include a collision mitigation system (CMS) which may make an initial warning (for example, winding up a seat belt or braking the subject vehicle) earlier than its normal operation, based on detecting that the visibility in front of the vehicle is poor. The collision mitigation system may also shorten a brake reaction latency period, which is a time interval between a start of a user's braking operation and a start of deceleration of the subject vehicle, by controlling a brake actuator to apply a downward force (or pre-compression) to a brake pedal. It is thus possible to use the result of detection of the visibility in front of the subject vehicle for assisting a driver's operation on the subject vehicle.

Figure 6:
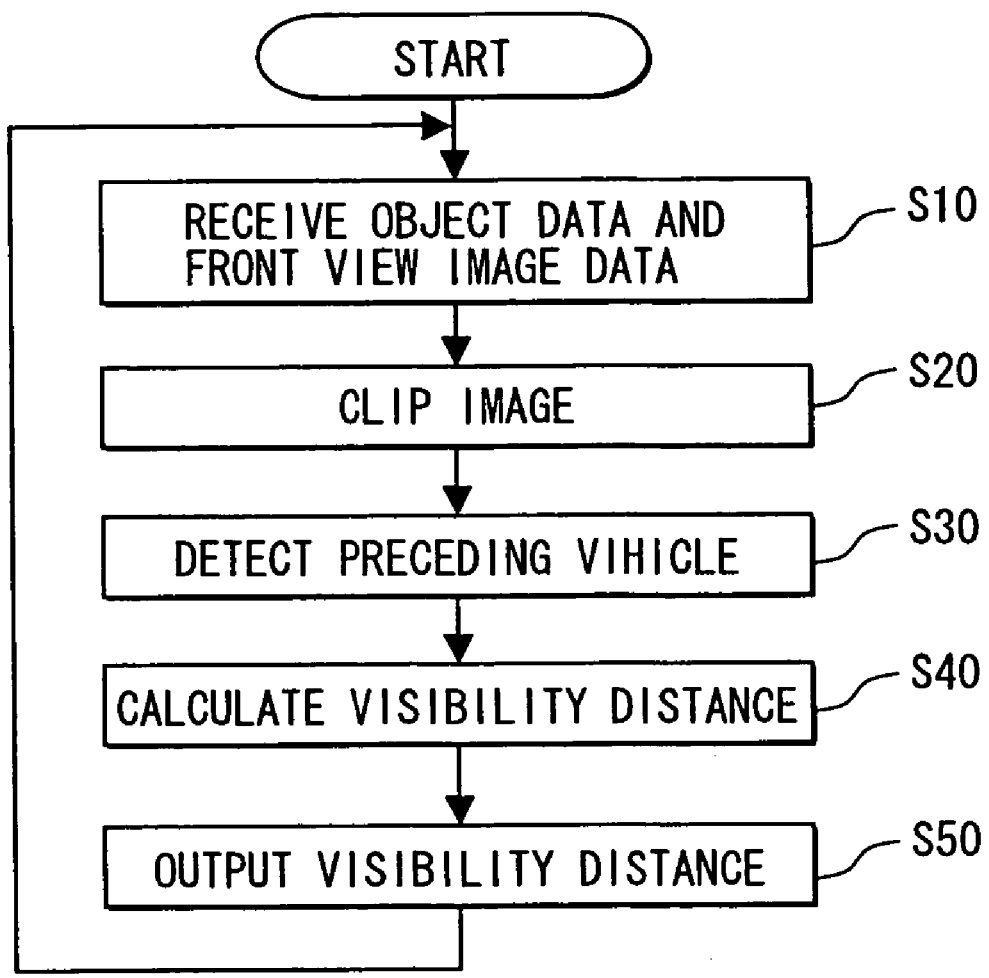
FIG. 6 is a flowchart showing a process executed by an image processing unit.

Next, an operation of the image processing unit 30 as an example of the first embodiment will be explained with reference to a flowchart shown in FIG. 6. First, the image processing unit 30 receives at Step S10 the object data from the radar 10 and the front view image data from the camera 20. Subsequently at Step S20, based on the inter-vehicle distance and the lateral position in the received object data, the image processing unit 30 determines a region, which is in the image indicated by the front view image data and is expected to contain a position of the preceding vehicle. Further at Step S20, the image processing unit 30 clips an image (that is, the clipped image) corresponding to the determined region from the front view image data.

At Step S30, the image processing unit 30 executes an image calculation process for trying to detect, based on the clipped image, the preceding vehicle in the image in front of the subject vehicle acquired by the camera 20. At Step S40, the image processing unit 30 detects the poor visibility in front of the subject vehicle when the preceding vehicle is not detected at Step S40 in the clipped image. The image processing unit 30 further executes at Step S40 a visibility distance calculation process to estimate the visibility distance in front of the subject vehicle. At Step S50, the image processing unit 30 outputs the result of the visibility distance calculation process.

Thus, the image processing device as the example of the first embodiment detects the visibility in front of the subject vehicle based on the object data from the radar 10 and the result of trying to detect the preceding vehicle based on the clipped image. It is possible to detect the visibility in front of the vehicle by using the result of detection of the radar 10.

Second Embodiment

Hereinafter, an example of a second embodiment according to the present invention will be described mainly focused on differences between the first embodiment and the second embodiment. Structures and operations which the examples of the first and second embodiments have in common are not described in detail. The image calculation unit 33 of the example of the first embodiment detects poor visibility in front of the subject vehicle and estimates the visibility distance (such as "equal to or less than M meters") in front of the subject vehicle.

In contrast, the image calculation unit 33 of the example of the second embodiment estimates the visibility distance in front of the subject vehicle, based on (i) time variation of the inter-vehicle distance from the subject vehicle and the preceding vehicle and (ii) time variation of the result of trying to detect the preceding vehicle in the clipped image. This operation of the image calculation unit 33 is made at Step S40 in FIG. 6.

Figure 3A:
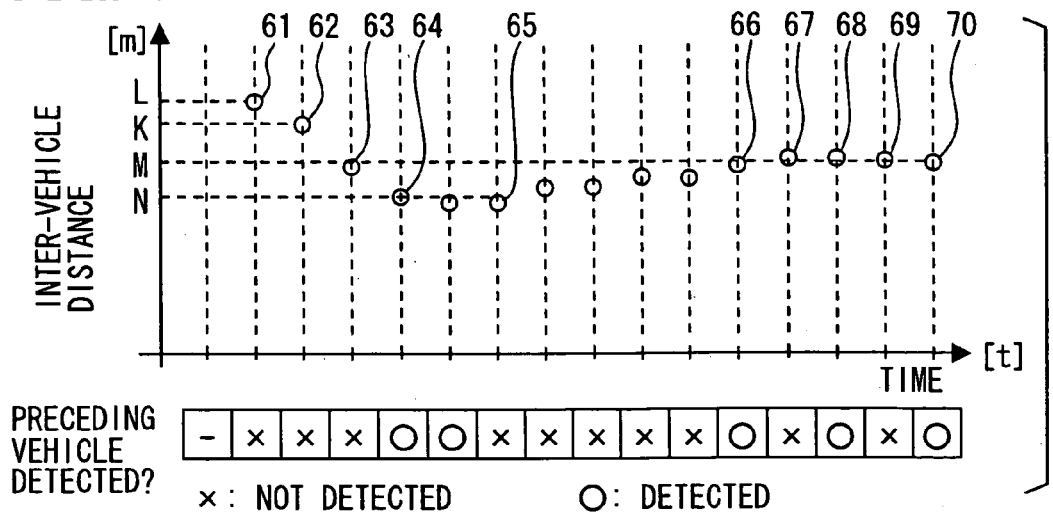
FIGS. 3A-3C are schematic diagrams showing a method as an example according to a second embodiment for estimating the visibility distance.

In FIG. 3A, a relation between the time variation of the inter-vehicle distance and the time variation of the result of trying to detect the preceding vehicle in the clipped image are shown. The time variation of the inter-vehicle distance is detected, as described in the example of the first embodiment, by using the object data from the radar 10. The visibility distance in front of the subject vehicle is equal to or less than L meters when, as shown in FIG. 3A, the detected inter-vehicle distance is L meters and the image calculation unit 33 fails to detect the preceding vehicle in the clipped image.

Figure 3B:
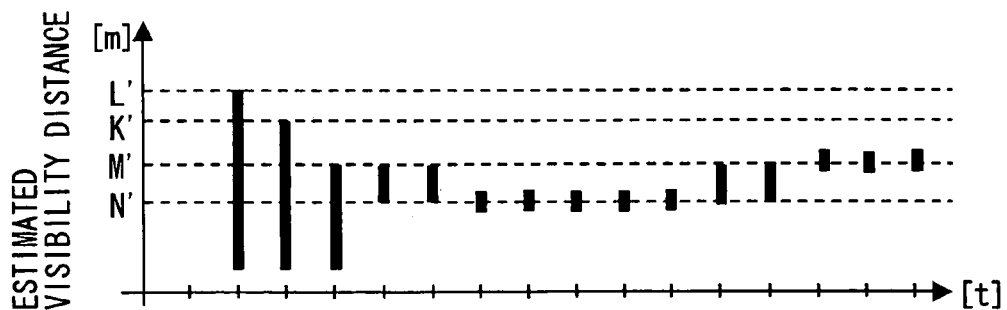
Figure 3C:
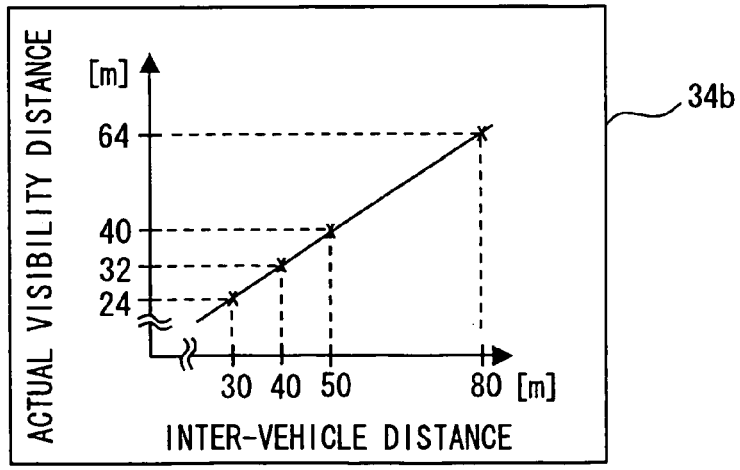

Then the image calculation unit 33 can estimate, as shown in FIG. 3B, the visibility distance in front of the vehicle to be between 0 meter and L' meters, by correcting difference between the detection characteristics of the camera 20 and the human's eyesight to the visible light by using the visibility distance transformation table 34b in FIG. 3C.

The range (for example, the range from 0 meter to L' meters) estimated as the visibility distance can be narrowed by considering the time variation of the inter-vehicle distance and the time variation of the result of trying to detect the preceding vehicle in the clipped image. According to FIG. 3A, the image calculation unit 33 consecutively fails at time instants 61, 62, and 63 to detect the preceding vehicle in the clipped image while the inter-vehicle distance detected by using the radar 10 is decreasing from L meters through K meters to M meters. At this time, the image calculation unit 33 may narrow, as shown in FIG. 3B, the range of the estimated visibility distance from "from 0 meter to L' meters" through "from 0 meter to K' meters" to "from 0 meter to M' meters", based on the consecutive failures of the detection of the preceding vehicle in the clipped image.

According to FIG. 3A, the image calculation unit 33 succeeds at a time instant 64 in detecting the preceding vehicle in the clipped image when the detected inter-vehicle distance decreases from M meters to N meters. At this time, it is likely that the driver of the subject vehicle can see an object located from 0 meters to N' meters ahead of the subject vehicle. The image calculation unit 33 therefore further narrows the range of the estimated visibility distance to "from N' meters to M' meters".

According to FIG. 3A, the image calculation unit 33 fails again at a time instant 65 to detect the preceding vehicle in the clipped image when the detected inter-vehicle distance becomes slightly different from N meters. At this time, the image calculation unit 33 may estimate as shown in FIG. 3B that the visibility distance is approximately N' metes or approximately M' meters. However, it is unlikely that the visibility distance is approximately M' meters, because the image calculation unit 33 could not detect the preceding vehicle in the clipped image when the inter-vehicle distance detected by using the radar 10 is within from L meters to M meters. The image calculation unit 33 may therefore estimate that the visibility distance is approximately N' meters.

According to FIG. 3A, the image calculation unit 33 succeeds again at a time instant 66 in detecting the preceding vehicle in the clipped image when the detected inter-vehicle distance increases to M meters. At this time, the image calculation unit 33 estimates the visibility distance to be within from N' meters to M' meters, because the preceding vehicle was once detected in the clipped image when the detected inter-vehicle distance was N' meters.

According to FIG. 3A, the image calculation unit 33 alternately fails in and succeeds in at time instants 66 to 70 the detection of the preceding vehicle in the clipped image when the detected inter-vehicle distance is approximately M meters. At this time, the image calculation unit 33 estimates the visibility distance to be approximately M' meters.

The image calculation unit 33 thus narrows a range which the visibility distance is estimated to be within, by estimating the visibility distance based on the time variation of the inter-vehicle distance detected by the radar 10 and the time variation of the result of trying to detect the preceding vehicle in the clipped image. In addition, the image calculation unit 33 can estimate an approximate visibility distance when the detected inter-vehicle distance and the result of trying to detect the preceding vehicle change in a certain manner.

Third Embodiment

Hereinafter, an example of a third embodiment according to the present invention will be described mainly focused on differences the examples of the first and second embodiments. Structures and operations which the examples of the first (or second) and third embodiments have in common are not described in detail. The image calculation unit 33 of the example of the first embodiment detects poor visibility in front of the subject vehicle and estimates the visibility distance (such as "equal to or less than M meters") in front of the subject vehicle.

The image calculation unit 33 of the example of the second embodiment estimates the visibility distance in front of the subject vehicle, based on the time variation of the inter-vehicle distance detected by the radar 10 and the time variation of the result of trying to detect the preceding vehicle in the clipped image.

In contrast, the image calculation unit 33 of the example of the third embodiment estimates the visibility distance in front of the subject vehicle, based on the inter-vehicle distance detected by the object data from the radar 10 and result of frequency analysis regarding brightness distribution of the clipped image. This operation of the image calculation unit 33 is made at Step S30 or S40 in FIG. 6.

As described above, the preceding vehicle is clearly shown in the clear image acquired by the camera 20 when no fog is around the subject vehicle. On the other hand, the preceding vehicle is not clearly shown in the blurred image acquired by the camera 20 when fog is, as shown in FIG. 4, in front of the subject vehicle.

Sharpness (or edge enhancement) of a border between two objects in the acquired image becomes higher as the acquired image becomes clearer. In frequency characteristics of brightness distribution in the acquired image, high frequency components therefore become more dominant as the acquired image becomes clearer.

A degree of blur of the acquired image varies depending on the inter-vehicle distance when the actual visibility distance is constant. The image calculation unit 33 therefore estimates the visibility distance around the subject vehicle based on result of frequency analysis of the brightness distribution in the image acquired by the camera 20.

Figure 4:
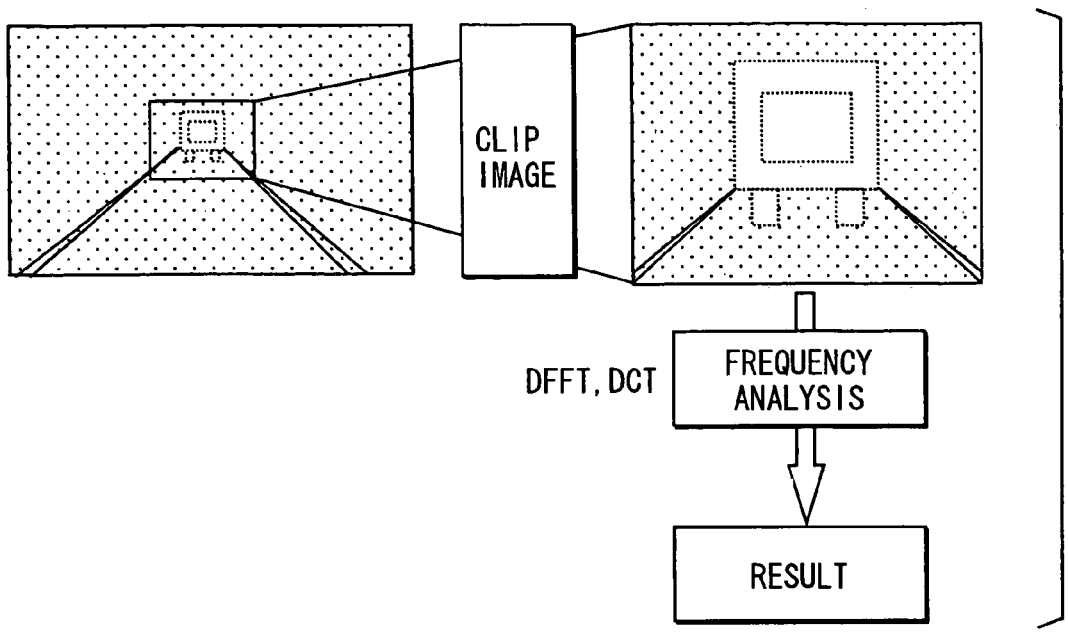
FIG. 4 is a schematic diagram showing a frequency analyzing calculation as an example according to a third embodiment.
Figure 5:
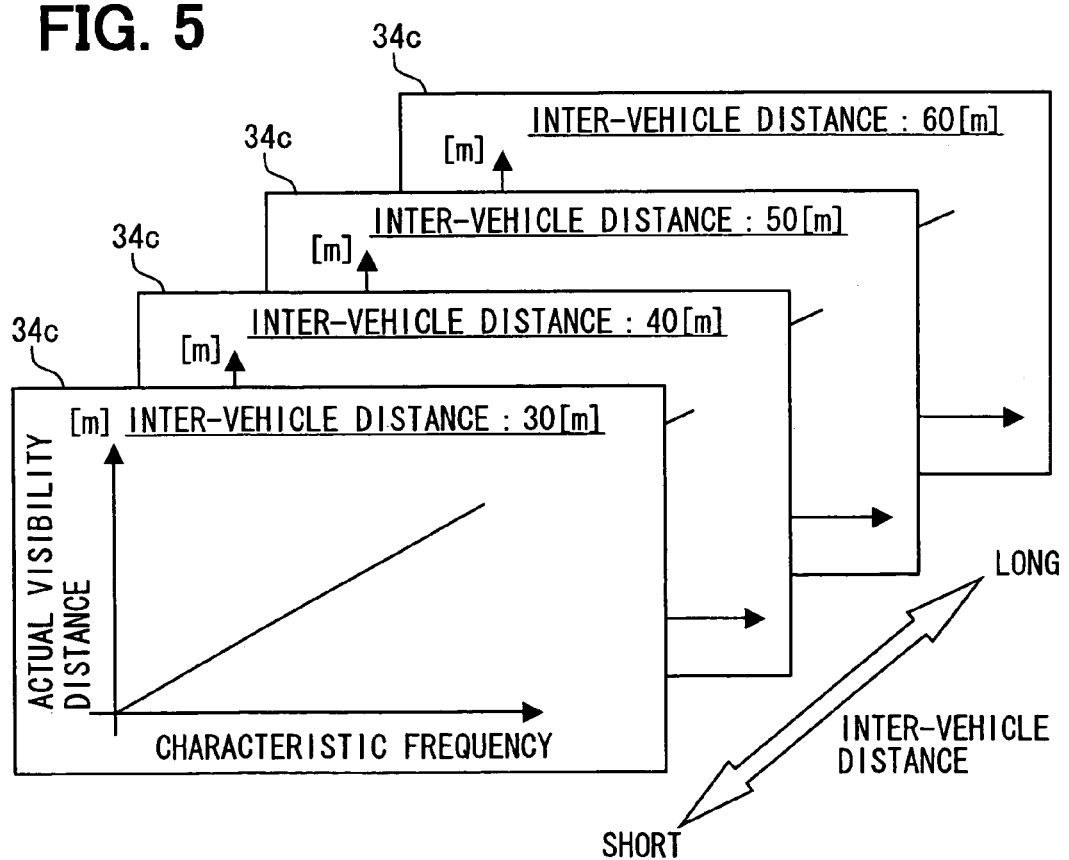
FIG. 5 is a diagram illustrating each table defining a relation between a frequency characteristic and an actual visibility distance with a parameter of a distance from a vehicle to a preceding vehicle.

More specifically, the image calculation unit 33 executes as shown in FIG. 4 frequency analysis in which frequency components (for example, a power spectrum) of the brightness distribution in the clipped image are calculated by means of well-known image processing methods such as DFFT (Discrete Fast Fourier Transformation) and DCT (Discrete Cosine Transformation). Then the image calculation unit 33 specifies a characteristic frequency as a result of the frequency analysis. The characteristic frequency is a value quantitatively indicating frequency characteristics of the brightness distribution of the clipped image. In specifying the characteristic frequency, the image calculation unit 33 repeatedly adds to a value one of the frequency components (for example, coefficients in the power spectrum) while increasing a frequency for the one frequency component step by step starting from the first basis function (that is, the lowest frequency). When the resultant value reaches a predetermined power threshold at a step, the frequency used at the step is specified as the characteristic frequency. The predetermined power threshold is an optimum threshold obtained through experiments.

As described above, the degree of the blur in the clipped image varies depending on the inter-vehicle distance. The image calculation unit 33 may therefore use visibility distance transformation tables 34c shown in FIG. 5, each of which describes a relation between the actual visibility distance and the characteristic frequency with a parameter of an inter-vehicle distance. More specifically, the image calculation unit 33 selects one of the visibility distance transformation tables 34c corresponding to the inter-vehicle distance detected based on the object data from the radar 10, and then estimates, by using the selected table, the actual visibility distance in front of the subject vehicle based on the characteristic frequency of the brightness distribution in the clipped image. Therefore, the image calculation unit 33 can correctly estimate the visibility distance even if the degree of the blur of the clipped image changes depending on the inter-vehicle distance.

Brightness of the preceding vehicle changes depending on the color (for example, gray, white, or black) of the preceding vehicle. The relations between the actual visibility distance and the characteristic frequency may change depending on the brightness of the preceding vehicle. The image calculation unit 33 may therefore use visibility distance transformation tables (or mapping data), each of which describes a relation between the actual visibility distance and the characteristic frequency with parameters of an inter-vehicle distance and a value of the brightness of the preceding vehicle. More specifically, the image calculation unit 33 selects one of the visibility distance transformation tables corresponding to the brightness of the preceding vehicle and the inter-vehicle distance detected based on the object data from the radar 10, and then estimates, by using the selected table, the actual visibility distance in front of the subject vehicle based on the characteristic frequency of the brightness distribution in the clipped image. Therefore, the image calculation unit 33 can estimate the visibility distance with higher degree of accuracy by selecting one of the visibility distance transformation tables based on the brightness of the preceding vehicle.

When the clipped image is blurred, the image calculation unit 33 can detect the brightness of the preceding vehicle by calculating an average brightness of the blurred image. The image calculation unit 33 therefore selects a visibility distance transformation table suitable for the detected brightness of the object.

Each or any combination of processes or steps explained in the above can be achieved as a software unit (e.g., subroutine) and/or a hardware unit (e.g., circuit or integrated circuit), including or not including a function of a related device; furthermore, the hardware unit can be constructed inside of a microcomputer.

It will be obvious to those skilled in the art that various changes may be made in the above-described embodiments of the present invention. However, the scope of the present invention should be determined by the following claims.

What is claimed is:

1. An image processing device for a vehicle, comprising:
   means for detecting an object by transmitting a radio wave outside of the vehicle and detecting the object in a first area outside of the vehicle by using a reflected wave of the transmitted radio wave, the object detecting means detecting a distance from the vehicle to the detected object in the first area outside of the vehicle by using the reflected wave of the transmitted radio wave;
   means for acquiring an image in a second area including the first area;
   means for processing the acquired image to detect, in the acquired image, the object detected by the object detecting means, the image processing means executing frequency analysis of brightness distribution in the acquired image;
   means for detecting visibility outside of the vehicle based on the result of the detection of the object detecting means and the result of the detection of the processing means; and
   means for estimating a visibility distance outside of the vehicle based on the detected distance and the result of the frequency analysis.

2. The image processing device of claim 1, wherein the visibility detecting means detects poor visibility outside of the vehicle when the image processing means fails to detect in the acquired image the object detected by the object detecting means.

3. The image processing device of claim 1, wherein the result of detection of the image processing means is one of that the detection of the image processing means has succeeded and that the detection of the image processing means has failed.

4. The image processing device of claim 3, wherein the visibility detecting means detects the visibility distance based on time variation of the detected distance and time variation of the result of detection of the image processing means.

5. An image processing device for a vehicle, comprising:
   means for detecting an object by transmitting a radio wave outside of the vehicle and detecting a distance from the vehicle to the object in a first area outside of the vehicle by using a reflected wave of the transmitted radio wave;
   means for acquiring an image of a second area including the first area;
   means for executing frequency analysis of brightness distribution in the acquired image the executing means calculating frequency characteristics of the brightness distribution in the acquired image;
   means for estimating a visibility distance outside of the vehicle based on the detected distance and result of the frequency analysis; and
   means for storing mapping data used for transforming the calculated frequency characteristics to the visibility distance with a parameter of the detected distance; wherein
   the estimating means estimates the visibility distance from the calculated frequency characteristics by using the stored mapping data.

6. The image processing device of claim 5, wherein
   the mapping data used for transforming the calculated frequency characteristics to the visibility distance with the parameter of the detected distance is stored with a parameter of brightness of the object in the acquired image, and
   the estimating means estimates the visibility distance from the calculated frequency characteristics by using the mapping data with the parameters of the detected distance and the brightness of the object in the acquired image.

7. The image processing device of claim 1, further comprising:
   means for assisting driving operation of a driver of the vehicle by using the detected visibility.

8. The image processing device of claim 5, further comprising
   means for assisting driving operation of a driver of the vehicle by using the estimated visibility distance.

9. A method for image processing for an image processing device in a vehicle, the method comprising:
   detecting an object in a first area outside of the vehicle by transmitting a radio wave and using a reflected wave of the transmitted radio wave;
   detecting a distance from the vehicle to the detected object in the first area outside of the vehicle by using the reflected wave of the transmitted radio wave;
   acquiring an image in a second area including the first area;
   executing frequency analysis of brightness distribution in the acquired image;
   determining the detected object in the acquired image by processing the acquired image;
   detecting visibility outside of the vehicle based on the result of detecting the object and the result of determining the detected object in the acquired image; and
   estimating a visibility distance outside of the vehicle based on the detected distance and the result of the frequency analysis.

10. An image processing device for a vehicle, comprising:
    an object detecting unit that transmits a radio wave outside of the vehicle and detects an object in a first area outside of the vehicle by using a reflected wave of the transmitted radio wave, the object detecting unit detecting a distance from the vehicle to the detected object in the first area outside the vehicle by using the reflected wave of the transmitted radio wave;
    an image acquisition unit that acquires an image in a second area including the first area;
    an image processing unit that processes the acquired image to detect, in the acquired image, the object detected by the object detecting unit, the image processing unit executing frequency analysis of brightness distribution in the acquired images;
    a visibility detecting unit that detects visibility outside of the vehicle based on result of detection of the object detecting unit and result of detection of the image processing unit; and
    a visibility estimating unit that estimates a visibility distance outside the vehicle based on the detected distance and the result of the frequency analysis.

* * * * *